(12) United States Patent
Jiang

(10) Patent No.: US 7,242,819 B2
(45) Date of Patent: Jul. 10, 2007

(54) METHOD AND SYSTEM FOR ADVANCED EDGE-ADAPTIVE INTERPOLATION FOR INTERLACE-TO-PROGRESSIVE CONVERSION

(75) Inventor: Jiande Jiang, San Jose, CA (US)

(73) Assignee: Trident Microsystems, Inc., Sunnyvale, CA (US)

( * ) Notice: Subject to any disclaimer, the term of this patent is extended or adjusted under 35 U.S.C. 154(b) by 716 days.

(21) Appl. No.: 10/318,618

(22) Filed: Dec. 13, 2002

(65) Prior Publication Data

US 2004/0114833 A1  Jun. 17, 2004

(51) Int. Cl.
*G06K 9/32* (2006.01)
*G06K 9/40* (2006.01)
*H04N 1/46* (2006.01)

(52) U.S. Cl. .................. 382/300; 382/266; 382/275; 358/525

(58) Field of Classification Search ............... 382/199, 382/262, 300, 266, 275; 348/448, 458; 358/525
See application file for complete search history.

(56) References Cited

U.S. PATENT DOCUMENTS 5,347,599 A    9/1994  Yamashita et al.
5,438,552 A *  8/1995  Audi et al. .................. 367/88

(Continued)

FOREIGN PATENT DOCUMENTS

JP        9-037214       0/0000

JP        A-04-364685    0/0000

(Continued)

OTHER PUBLICATIONS

Notification of Reason for Rejection (English Translation) as received from the Japanese Patent Office dated Feb. 27, 2006 in connection with the corresponding Japanese Patent Application No. 2003-414313.

(Continued)

*Primary Examiner*—Matthew C. Bella
*Assistant Examiner*—Yubin Hung
(74) *Attorney, Agent, or Firm*—DLA Piper US LLP

(57) ABSTRACT

An improved method and system for edge adaptive interpolation. The method uses a "9×2" window to detect the edge direction with post-processing to remove any artifacts due to the possible false edge detection, and a hierarchical scheme is employed to reduce the computation required. The method detects if there is edge existing along the current pixel. If there is no edge, then the edge detection output will be 90 degrees (the interpolation will be performed along the vertical direction). If an edge does exist, the method determines whether the edge direction falls within a first or second direction group. Once the edge direction is assigned to a particular group (e.g., 0–90 degrees or 90–180 degrees), the edge direction will be detected among five (5) possible directions. To further improve the edge detection precision, and also to remove the possibility of false edge direction detection, a post-processing technique may be applied to the edge direction signal. After the edge signal post-processing, the edge direction information is then passed to an edge adaptive interpolation block to perform the interpolation along the edge direction detected. Still another post-processing technique may be applied to the edge adaptive interpolated signal to further remove the possible noise due to an incorrect edge direction detection.

26 Claims, 9 Drawing Sheets

U.S. PATENT DOCUMENTS

| | | | |
|---|---|---|---|
| 5,832,143 | A | 11/1998 | Suga et al. |
| 5,886,745 | A | 3/1999 | Muraji et al. |
| 6,421,090 | B1 * | 7/2002 | Jiang et al. ................. 348/452 |
| 6,614,484 | B1 * | 9/2003 | Lim et al. .................... 348/448 |
| 6,810,156 | B1 * | 10/2004 | Itoh ........................... 382/300 |
| 6,904,169 | B2 * | 6/2005 | Kalevo et al. ............... 382/167 |
| 7,043,091 | B2 * | 5/2006 | Michel ........................ 382/266 |
| 2002/0028028 | A1 * | 3/2002 | Michel ........................ 382/299 |
| 2003/0156301 | A1 * | 8/2003 | Kempf et al. ............... 358/486 |
| 2004/0165785 | A1 * | 8/2004 | Monobe et al. ............. 382/268 |

FOREIGN PATENT DOCUMENTS

| | | |
|---|---|---|
| JP | A-05-153562 | 0/0000 |
| JP | A-11-146346 | 0/0000 |
| JP | A-11-331773 | 0/0000 |

OTHER PUBLICATIONS

Office Action (English and Chinese translations) as received from the Chinese Patent Office dated Apr. 15, 2005 in connection with the corresponding Chinese Patent Application No. 200310124636.9.

Notice of Preliminary Rejection English and Korean Translations) as received from the Korean Patent Office dated Sep. 16, 2005 in connection with the corresponding Korean Patent Application No. 10-2003-0090781.

* cited by examiner

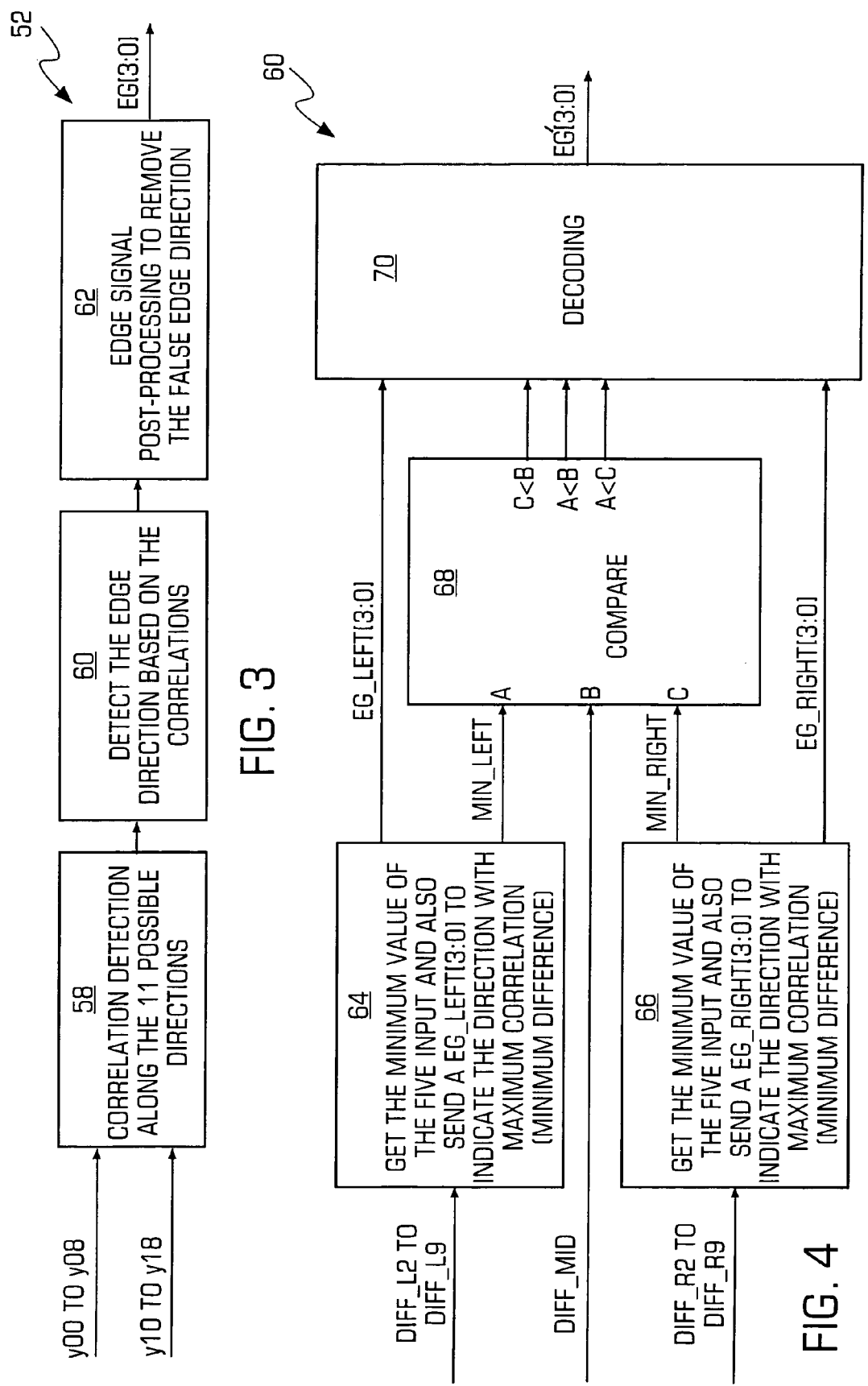

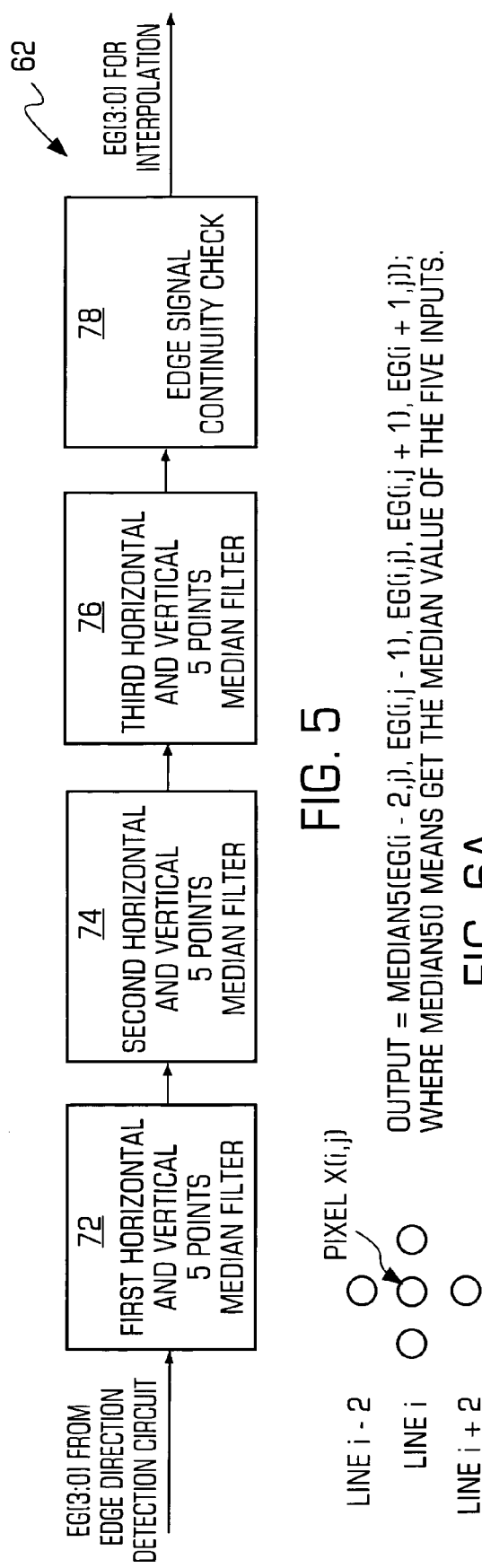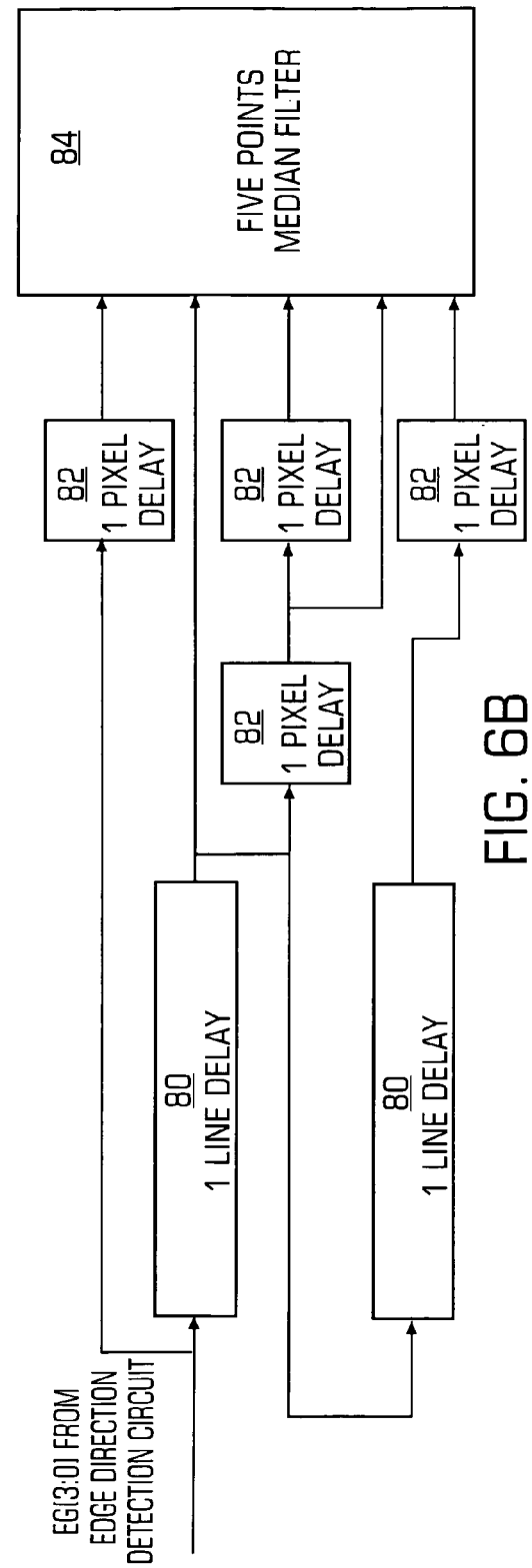
FIG. 5
FIG. 6A
FIG. 6B

METHOD AND SYSTEM FOR ADVANCED EDGE-ADAPTIVE INTERPOLATION FOR INTERLACE-TO-PROGRESSIVE CONVERSION

FIELD OF THE INVENTION

The present invention generally relates to image processing methods and systems, and more particularly, to a method and system for advanced edge adaptive interpolation for interlace to progressive conversion, which may be used to improve the resolution of pixilated images.

BACKGROUND OF THE INVENTION

Interlaced scanning schemes have been widely adopted in current display monitor systems, including television systems. In a typical interlaced system, the sequence of video fields alternates between odd fields (e.g., fields containing odd numbered lines) and even fields (e.g., fields containing even numbered lines). A conventional display monitor receiving the sequence of fields reproduces each video field in the sequence. Each field is displayed on the display screen, such as a television. For example, first an odd field is displayed, using the odd-numbered scan lines, and then an even field is displayed using the even-numbered scan lines, and so on.

There many disadvantages to this type of interlace system, such as edge flicker, line flicker and line crawling. Furthermore, as the demand of using large screen displays increases, these problems have become more critical. An interlace to non-interlace conversion is a very good solution to remove such problems.

An interlace to non-interlace conversion involves generating a missing line between two adjacent lines in an interlaced signal. Motion adaptive interlace to non-interlace conversion is widely used in current available interlace to non-interlace converters. In such converters, every pixel is classified as a motion or static pixel. For each static pixel, field insertion is executed to generate the missing pixel since there is no motion between consecutive fields. The same vertical resolution will be kept for the static portion of the picture. For each motion pixel, intra-field interpolation is executed to generate the missing pixel.

Normally, most converters only utilize vertical interpolation for the intra-field interpolation. There is no motion effect for the motion portion of the picture. However, jagged edges may result for image objects having diagonal edges. Jagged edges resulting from interpolation are a visually annoying defect, and can sometimes occur to a degree worse than that on an interlaced display. Processing a display signal using edge-adaptive interpolation can eliminate or reduce jagged edge defects that can result from the motion adaptive interlace-to-progressive conversion of prior art systems. An edge adaptive interpolation will solve this problem by performing the interpolation along the edge direction.

In order to perform interpolation along an edge direction, the manner of detecting the edge direction that passes through the missing pixel is important. Edge adaptive interpolation along an image object's edge involves correctly determining the direction of an edge passing through a missing pixel (a pixel that will be generated to form the interpolated line between existing adjacent lines in the interlace signal being converted). Previous methods have utilized various "window" sizes to detect the possible edge directions. For example, some systems utilize a "3×2" window around a missing pixel, which allows only three (3) possible directions to be detected. Other methods have used as large as a "7×2" window which provides seven (7) possible directions to be detected. One example of such a method is described in U.S. patent application Ser. No. 10/154,628, entitled "Method and System for Edge-Adaptive Interpolation for Interlace-to-Progressive Concern," which is assigned to the present assignee and which is fully and completely incorporated herein by reference. It will be appreciated by those skilled in the art that the computation required for a "7×2" window is much higher than that for a "3×2" window. That is, the larger the window size, the more computation power needed. Additionally, with a larger window size, there exists a greater possibility of false edge direction detection. Once a false edge direction has occurred, a visually annoying dot may appear on the interpolated picture.

As a result, some prior edge adaptive interpolation methods only employ a "3×2" window to minimize the computation power and also the possibility of false detection. But with a "3×2" window, the interpolation can vary only along 45 degree, 90 degree and 135 degree directions. The result will exhibit aliasing, i.e., most of the edge will still appear jagged. Methods utilizing a "7×2" window provide some improvement over convention "3×2" systems. However, even these improved methods perform detection based around a single pixel or point, without efficiently utilizing neighboring information that can increase the accuracy of the detection process.

The present invention provides an improvement over these prior edge adaptive interpolation methods and systems. Particularly, the present invention provides an improved system and method, which utilizes a "9×2" window around a pixel, along with information from neighboring pixels to provide edge-adaptive interpolation.

SUMMARY OF THE INVENTION

The present invention provides an improved method and system for edge adaptive interpolation. In one embodiment, the method uses a "9×2" window to detect the edge direction with post-processing to remove any artifacts due to possible false edge detection. A hierarchical scheme may also be employed to reduce the computation required. First, the method detects if there is edge existing along the current pixel. If there is no edge, then the edge detection output will be 90 degrees (the interpolation will be performed along the vertical direction). If an edge does exist, the method determines whether the edge direction is between 0 and 90 degrees, or between 90 and 180 degrees. Once the edge direction is assigned to a particular group (e.g., 0–90 degrees or 90–180 degrees), the edge direction will be detected among five (5) possible directions. The above edge detection process provides an initial edge direction determination. To further improve the edge detection precision, and also to remove the possibility of false edge direction detection, a post-processing technique is applied to the edge direction signal. After the edge signal post-processing, the edge direction information is then passed to the edge adaptive interpolation block to perform interpolation along the edge direction detected. Still another post-processing technique may be applied to the edge adaptive interpolated signal to further remove the possible noise due to an incorrect edge direction detection.

According to one aspect of the present invention, a method of edge adaptive interpolation for improving the resolution of a pixilated image. The method includes the steps of: receiving data for a first group of pixels and a second group of pixels; determining whether an edge within the image passes through a first pixel located between the first and second group of pixels and whether the edge extends in a first set of directions or a second set of directions to identify a selected set of directions, wherein the determining includes calculating correlation values for each of the directions in the first and second sets; determining a direction signal from the selected set of directions by selecting a minimum correlation value for the selected set of directions; performing a post-processing procedure on the selected direction signal to substantially remove possible error; and determining a luminance value for the first pixel in response to the selected direction.

According to another aspect of the present invention, a system is provided for improving the resolution of a pixilated image. The system includes a first portion for receiving data for a first group of pixels and a second group of pixels. A second portion determines whether an edge within the image passes through a first pixel located between the first and second group of pixels and whether the edge extends in a first set of directions or a second set of directions to identify a selected set of directions. The second portion is adapted to make the determination by calculating correlation values for each of the directions in the first and second sets. A third portion determines a direction signal from the selected set of directions by selecting a minimum correlation value for the selected set of directions. A fourth portion performs a post-processing procedure on the selected direction signal to substantially remove possible error. The system also includes a fifth portion that determines a luminance value for the first pixel in response to the selected direction.

These and other features and advantages of the invention will become apparent by reference to the following specification and by reference to the following drawings.

BRIEF DESCRIPTION OF THE DRAWINGS

FIG. 3 is a block diagram illustrating an edge direction detection method and system, according to one embodiment of the present invention.

FIG. 4 is a block diagram illustrating a method and system for detecting edge direction based on correlations, according to one embodiment of the present invention.

FIG. 5 is a block diagram illustrating a method and system for post-processing an edge signal, according to one embodiment of the present invention.

FIG. 6A is a group of pixels used in a five points median processing method and system, according to one embodiment of the present invention.

FIG. 6B is a block diagram illustrating a five points median processing method and system, according to one embodiment of the present invention.

DETAILED DESCRIPTION OF THE EMBODIMENTS

Figure 1:
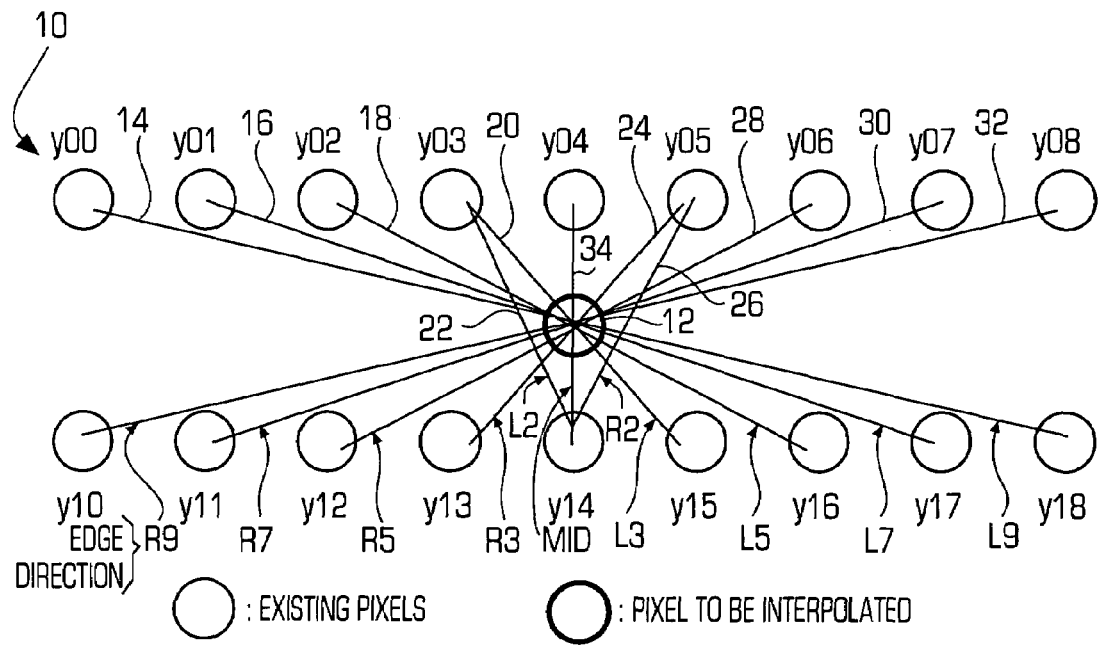
FIG. 1 illustrates a 9×2 pixel window that can be used to detect edge direction in one embodiment of the present invention.

The present invention will now be described in detail with reference to the drawings, which are provided as illustrative examples of the invention so as to enable those skilled in the art to practice the invention. Notably, the implementation of certain elements of the present invention may be accomplished using software, hardware, firmware or any combination thereof, as would be apparent to those of ordinary skill in the art, and the figures and examples below are not meant to limit the scope of the present invention. Moreover, where certain elements of the present invention can be partially or fully implemented using known components, only those portions of such known components that are necessary for an understanding of the present invention will be described, and detailed descriptions of other portions of such known components will be omitted so as not to obscure the invention. Preferred embodiments of the present invention are illustrated in the Figures, like numerals being used to refer to like and corresponding parts of various drawings.

Before addressing details of embodiments described below, some terms are defined or clarified. As used herein, the term "closer" and other comparative terms are to be construed as "closest" when three or more items are being compared.

The terms "actual image," "actual edge," and "actual direction" correspond to physical objects or a different image to which the pixilated image corresponds. The actual image, actual edge, and actual direction are parts of the input that will be output as a pixilated image. Ideally, the pixilated image will be substantially identical to the actual image.

The present invention provides an improved method and system for edge adaptive interpolation. In one embodiment, the method uses a "9×2" window to detect the edge direction with post-processing to remove any artifacts due to the possible false edge detection. A hierarchical scheme may also be employed to reduce the computation required. First, the method detects if there is an edge existing along the current pixel. If there is no edge, then the edge detection output will be 90 degrees (the interpolation will be performed along the vertical direction). If an edge does exist, the method determines whether the edge direction is between 0 and 90 degrees, or between 90 and 180 degrees. Once the edge direction is assigned to a particular group (e.g., 0–90 degrees or 90–180 degrees), the edge direction will be detected among five (5) possible directions. The above edge detection process provides an initial edge direction determination. To further improve the edge detection precision, and also to remove the false edge direction detection, a post-processing technique may be applied to the edge direction signal. After the edge signal post-processing block, the edge direction information may be then passed to the edge adaptive interpolation block to perform the interpolation along the edge direction detected. Still another post-processing technique may be applied to the edge adaptive interpolated signal to further remove possible noise due to an incorrect edge direction detection.

To perform edge adaptive interpolation along an image object's edge, the direction of an edge passing through a missing pixel is correctly determined. Once the direction is correctly determined, a pixel may be generated to form the interpolated line between existing adjacent lines in the interlace signal being converted. Various window sizes can be used to detect the possible edge direction. For example, FIG. 1 shows a "9×2" pixel window 10 (i.e., nine pixel pairs from the two interlaced signal lines on either side of a line to be interpolated, one pixel in each pixel pair belonging to each interlaced line) that can be used to detect an edge direction for generating an interpolated pixel 12. For a "9×2" pixel window 10, there are eleven possible edge directions, as indicated by edge direction lines 14–34. The two rows of nine pixels represent data that is received by a processor or system before proceeding with the present method. While the preferred embodiment discusses the use of a "9×2" window, it should be appreciated that the present invention is not limited to a window of this size, and that the system and method can also be used with windows of different sizes (e.g., larger or smaller sizes), such as a "7×2" or a "5×2" window.

Pixels Y00 to Y08 are pixels of the line right above the missing line and Y10 to Y18 are pixels of the line right below the missing line. The edge adaptive interpolation process that is performed using the window 10 is as follows: If a detected edge is along edge direction line 14 intersecting points Y00 and Y18 (corresponding to an edge direction of L9, which in one embodiment may equal about 166 degrees), then pixel 12 is set equal to (Y00+Y18)/2. If a detected edge is along edge direction line 16 intersecting points Y01 and Y17 (corresponding to an edge direction of L7, which in one embodiment may equal about 161.5 degrees), then pixel 12 is set equal to (Y01+Y17)/2. If a detected edge is along edge direction line 18 intersecting points Y02 and Y16 (corresponding to an edge direction of L5, which in one embodiment may equal about 153 degrees), then pixel 12 is set equal to (Y02+Y16)/2. If a detected edge is along edge direction line 20 intersecting points Y03 and Y15 (corresponding to an edge direction of L3, which in one embodiment may equal about 135 degrees), then pixel 12 is set equal to (Y03+Y15)/2. If a detected edge is along edge direction line 22 intersecting points Y03 and Y14 (corresponding to an edge direction of L2, which in one embodiment may equal about 117 degrees), then pixel 12 is set equal to (Y03+Y04+Y14+Y15)/4. If a detected edge is along edge direction line 24 intersecting points Y05 and Y14 (corresponding to an edge direction of R2, which in one embodiment may equal about 63 degrees), then pixel 12 is set equal to (Y04+Y05+Y13+Y14)/4. If a detected edge is along edge direction line 26 intersecting points Y05 and Y13 (corresponding to an edge direction of R3, which in one embodiment may equal about 45 degrees), then pixel 12 is set equal to (Y05+Y13)/2. If a detected edge is along edge direction line 28 intersecting points Y06 and Y12 (corresponding to an edge direction of R5, which in one embodiment may equal about 27 degrees), then pixel 12 is set equal to (Y06+Y12)/2. If a detected edge is along edge direction line 30 intersecting points Y07 and Y11 (corresponding to an edge direction of R7, which in one embodiment may equal about 18.5 degrees), then pixel 12 is set equal to (Y07+Y11)/2. If a detected edge is along edge direction line 32 intersecting points Y08 and Y10 (corresponding to an edge direction of R9, which in one embodiment may equal about 14 degrees), then pixel 12 is set equal to (Y08+Y10)/2. Otherwise, pixel 12 is set equal to (Y04+Y14)/2, which corresponds to either a detected edge direction along the 90 degree line 34 or to no edge. For purposes of this description, reference to a pixel (e.g., Y00–Y18) identifies the pixel and refers to its luminance value.

An important step in edge adaptive interpolation is the detection of the edge direction. The present invention improves over prior detections methods and systems such as those described in U.S. patent application Ser. No. 10/154,628, entitled "Method and System for Edge-Adaptive Interpolation for Interlace-to-Progressive Concern" (the "'628 application"), and U.S. patent application Ser. No. 10/038,277, entitled "Method and System for Single-Chip Integration of 3D Y/C Comb Filter and Interlace-to-Progressive Converter" (the "'277 application"), both of which are assigned to the present assignee and are fully and completely incorporated herein by reference. Like the above-referenced inventions, the method and system described herein can be implemented within a wide variety of displays, such as HDTV (High Definition Television) display monitors, HDTV-ready display monitors, progressive scan display monitors, and the like.

Furthermore, like the previous invention described in the '628 application, the present invention uses a hierarchical scheme to simplify the detection computation. However, in the present invention, a complex post-processing block in implemented on the detected edge direction signal in order to improve the edge detection performance and also to substantially eliminate or reduce false direction detection.

The present invention utilizes three general steps to identify the direction of an edge passing through an interpolated pixel 12. In the first step, the method and system determine if there is edge passing through interpolated pixel 12. In the second step, if an edge is passing through pixel 12, the method and system classify the eleven possible edge directions into three groups, and assign the detected edge to one of the groups. The first group comprises R9, R7, R5, R3, and R2 directions, ranging from 0 to 90 degrees. The second group comprises a direction of approximately 90 degrees, which means that no edge exists or that an edge exists along the 90 degree direction. The third group comprises L2, L3, L5, L7 and L9 directions, ranging from 90 to 180 degrees. In the third step, once the edge direction has been assigned to a group, the system and method determine the edge direction among the possible directions within each of the groups. The detected edge direction signal may then be passed to a post-processing block to improve the edge detection performance and also to remove the possibility of false detection.

Figure 2:
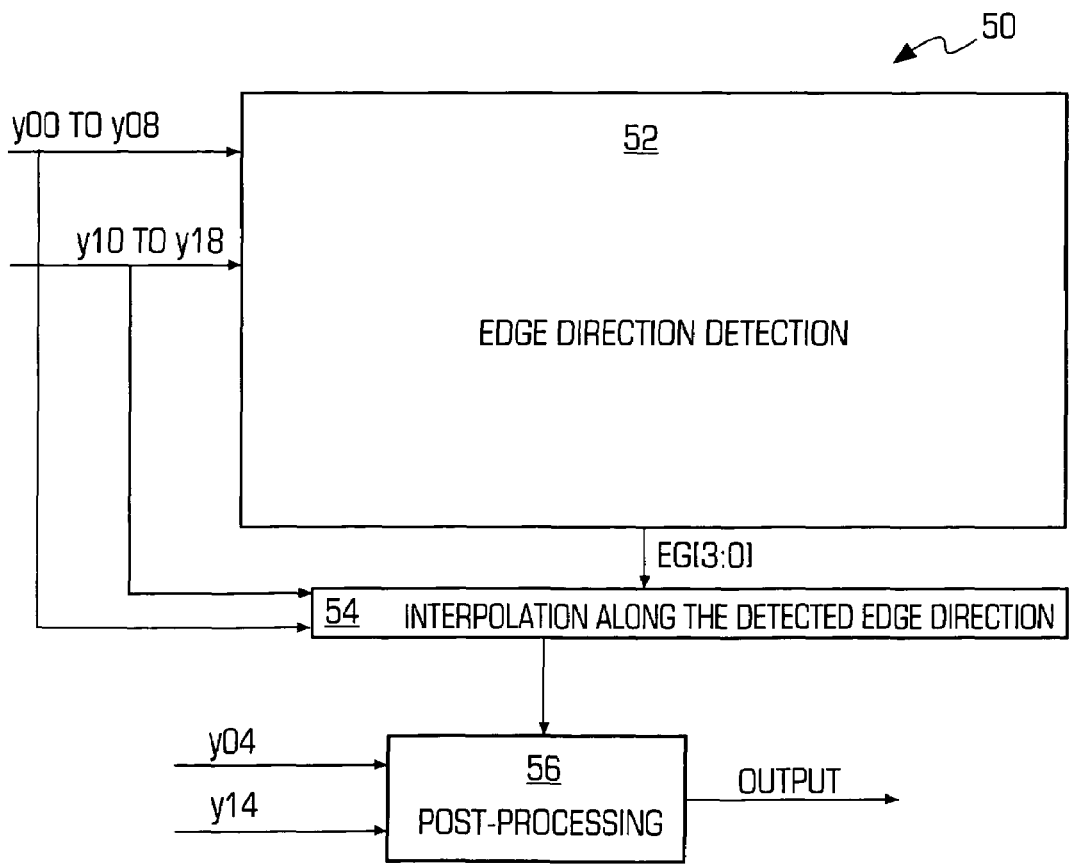
FIG. 2 is a block diagram illustrating a method and system for edge adaptive interpolation, according to one embodiment of the present invention.

FIG. 2 illustrates a block diagram of a method and system 50 for edge adaptive interpolation, according to one embodiment of the present invention. While the present invention will be primarily described in relation to a system 50, it should be appreciated that each of the portions or blocks illustrated in FIG. 2 (as well as the portions or blocks illustrated in the other Figures) may represent logic steps or processes and/or the hardware and/or software utilized to perform the logic steps or processes. It should further be appreciated that any one or more of the portions or blocks shown can be implemented in a computer readable medium as part of a system. In the preferred embodiment, conventional hardware, software and/or firmware may be used to perform the logic steps and/or processes. As shown in FIG. 2, the system 50 includes an edge direction detection portion or block 52, an interpolation portion or block 54, and a post-processing portion or block 56.

Edge direction detection portion or block 52 receives, as inputs, the luminance values for pixels Y00 through Y08 and pixels Y10 through Y18, shown in FIG. 1. FIGS. 3 through 8 further describe the edge detection portion or block 52. FIG. 3 illustrates the general architecture and operation of the edge detection portion or block 52. As shown, edge direction detection portion or block 52 includes a first block 58, which correlates the luminance values, a second block 60, which detects if there is an edge passing through a pixel that is to be interpolated (e.g., interpolated pixel 12) and determines the edge direction based upon the correlations, and a third block 62, which performs post processing on the edge signal to substantially eliminate or remove false edge detections. The final edge direction signal is outputted to block 54 as signal EG[3:0].

The edge detection algorithm begins in block 58, where a correlation is detected along the eleven possible directions for each of the pixels. In order to perform the correlation, the luminance values of the pixels are used because the human eye is very sensitive to luminance differences. The chroma (color) of the pixels is not used in the interpolation along an edge because the human eye is relatively insensitive to color differences as compared to luminance differences. In the present correlation algorithm, L(i, j) denotes the grayscale of the pixel located at row i and column j, and Y00, Y01, Y02, Y03, Y04, Y05, Y06, Y07, Y08, Y10, Y11, Y12, Y13, Y14, Y15, Y16, Y17 and Y18 denote the grayscale of the corresponding pixels. The coordinate of pixel 12 is (i, j). For example, y00=L(i−1, j−4), and y18=L(i+1, j+4).

The following correlation values are used in the edge direction detection algorithm:

DIFF_L9: the correlation measurement along direction L9;
DIFF_L7: the correlation measurement along direction L7;
DIFF_L5: the correlation measurement along direction L5;
DIFF_L3: the correlation measurement along direction L3;
DIFF_L2: the correlation measurement along direction L2;
DIFF_MID: the correlation measurement along direction MID;
DIFF_R2: the correlation measurement along direction R2;
DIFF_R3: the correlation measurement along direction R3;
DIFF_R5: the correlation measurement along direction R5;
DIFF_R7: the correlation measurement along direction R7; and
DIFF_R9: the correlation measurement along direction R9.

The above-delineated correlation values are calculated along each of the possible edge directions for the pixel to be interpolated located at (i,j) in the following manner:

DIFF_L9:
$$\text{DIFF\_L9} = 0;$$
$$\text{DIFF\_L9} = \sum_{k=-7}^{7} \text{abs}(L(i-1, j-4+k) - L(i+1, j+4+k));$$

DIFF_L7:
$$\text{DIFF\_L7} = 0;$$
$$\text{DIFF\_L7} = \sum_{k=-7}^{7} \text{abs}(L(i-1, j-3+k) - L(i+1, j+3+k));$$

DIFF_L5:
$$\text{DIFF\_L5} = 0;$$
$$\text{DIFF\_L5} = \sum_{k=-7}^{7} \text{abs}(L(i-1, j-2+k) - L(i+1, j+2+k));$$

DIFF_L3:
$$\text{DIFF\_L3} = 0;$$
$$\text{DIFF\_L3} = \sum_{k=-7}^{7} \text{abs}(L(i-1, j-1+k) - L(i+1, j+1+k));$$

DIFF_L2:
$$\text{DIFF\_L2} = 0;$$
$$\text{DIFF\_L2} = \sum_{k=-7}^{7} \text{abs}(L(i-1, j-1+k) - L(i+1, j+k));$$

DIFF_MID:
$$\text{DIFF\_MID} = 0;$$
$$\text{DIFF\_MID} = \sum_{k=-7}^{7} \text{abs}(L(i-1, j+k) - L(i+1, j+k));$$

DIFF_R2:
$$\text{DIFF\_R2} = 0;$$
$$\text{DIFF\_R2} = \sum_{k=-7}^{7} \text{abs}(L(i-1, j+1+k) - L(i+1, j+k));$$

DIFF_R3:
$$\text{DIFF\_R3} = 0;$$
$$\text{DIFF\_R3} = \sum_{k=-7}^{7} \text{abs}(L(i-1, j+1+k) - L(i+1, j-1+k));$$

DIFF_R5:
$$\text{DIFF\_R5} = 0;$$
$$\text{DIFF\_R5} = \sum_{k=-7}^{7} \text{abs}(L(i-1, j+2+k) - L(i+1, j-2+k));$$

DIFF_R7:
$$\text{DIFF\_R7} = 0;$$
$$\text{DIFF\_R7} = \sum_{k=-7}^{7} \text{abs}(L(i-1, j+3+k) - L(i+1, j-3+k)); \text{ and}$$

DIFF_R9:
$$\text{DIFF\_R9} = 0;$$
$$\text{DIFF\_R9} = \sum_{k=-7}^{7} \text{abs}(L(i-1, j+4+k) - L(i+1, j-4+k));$$

where the abs( ) function denotes the absolute value of the difference between the two luminance values. It should be appreciated that the present method provides a substantial improvement over prior correlation algorithms, such as the algorithm disclosed in the '628 application. Particularly, the present algorithm calculates a correlation value for each possible direction utilizing a summation of values (e.g., over a sequence of neighboring points) for each correlation value, rather than utilizing only a single value (e.g., at a single point). By using neighboring information to perform correlation calculations fore each possible direction, the present algorithm provides better accuracy than previous correlation methods.

Next, the system 50 detects if an edge exists, and if an edge exists system 50 determines the direction of the edge, based on the correlation values. FIG. 4 illustrates one embodiment of an edge detection method or system 60. The five correlation values from the 90 to 180 degrees group (i.e., DIFF_L2, DIFF_L3, DIFF_L5, DIFF_L7 and DIFF_L9) are inputted into block 64, and the five correlation values from the 0 to 90 degrees group (i.e., DIFF_R2 DIFF_R3, DIFF_R5, DIFF_R7, and DIFF_R9) are inputted into block 66. Block 64 compares the values from the 90 to 180 degrees group and selects the minimum correlation value, which it outputs as the Min_left signal. Block 66 compares the values from the last 0 to 90 degrees group and selects the minimum correlation value, which it outputs as the Min_right signal. According to this logic, the Min_left and Min_right signals shown in FIG. 4 may be determined as follows:

Min left=minimum_of(DIFF_L9, DIFF_L7 DIFF_L5 DIFF_L3, DIFF_L2); and

Min_right=minimum_of(DIFF_R9, DIFF_R7, DIFF_R5 DIFF_R3, DIFFR_2), where the minimum_of ( ) function is effective to select the minimum value of all the inputs.

Blocks 64 and 66 also respectively output EG_LEFT[3:0] and EG_RIGHT[3:0] signals, which represent the left and right directions having the minimum correlation values. Whether or not an edge exists is determined by comparing the Min_right, Min_left and DIFF_MID signals. This operation is performed in block 68, which may comprise a conventional comparator. For an edge to exist, the Min_left signal must be less than the DIFF_MID signal, the Min_right signal must be less than the DIFF_MID signal and the absolute value of the Min_left signal minus Min_right signal must be less than some predetermined threshold value. Using this logic, an Edge_exist signal may be determined as follows:

Edge_exist (Min_left<DIFF_MID) AND
(Min_right<DIFF_MID) AND
((abs(Min_left−Min_right)>Threshold).

In one non-limiting embodiment, the threshold may be 32.

The system then determines the group to which the edge direction belongs (e.g., the 0 to 90 degrees, 90 to 180 degrees, or 90 degree direction group). This determination may be performed within decoding block 70. In one embodiment, the decoding block may use the following algorithm to make this determination:

If ((Min_left<Min_right) AND (Min_left<DIFF_MID)) =>
  edge direction belongs to the third group (90 to 180 degrees),
else if ((Min_right<Min_left) AND (Min_right<DIFF_MID))=>
  edge direction belongs to the first group (0 to 90 degrees).
Else, the edge is along the 90 degree direction (direction MID).

The system may then determine the direction of the edge in the following manner:

If the edge direction is from 0 to 90 degrees:
  If (DIFF_R2 ==Min_right) then the edge direction is R2,
  else if (DIFF_R3 ==Min_right) then the edge direction is R3,
  else if (DIFF_R5 ==Min_right) then the edge direction is R5,
  else if (DIFF_R7 ==Min_right) then the edge direction is R7,
  else if (DIFF_R9 ==Min_right) then the edge direction is R9.
If edge direction is from 90 to 180 degrees:
  If (DIFF_L2 ==Min_left) then the edge direction is L2,
  else if (DIFF_L3 ==Min_left) then the edge direction is L3,
  else if (DIFF_L5 ==Min_left) then the edge direction is L5,
  else if (DIFF_L7 ==Min_left) then the edge direction is L7,
  else if (DIFF_L9 ==Min_left) then the edge direction is L9.

After the edge direction is detected as described above, the decoding block 70 generates a "pre-processed" edge direction signal EG'[3:0]. Since eleven possible directions exist, the system generates a 4-bit number or signal (e.g., EG'[3:0] and later EG[3:0]) to depict each direction. The corresponding relationship between each direction and the EG'[3:0]/EG[3:0] signal is as below:

EG'[3:0]/EG[3:0]
0000---->L9 direction
0001---->L7 direction
0010---->L5 direction
0011---->L3 direction
0100---->L2 direction
0101---->MID direction
0110---->R2 direction
0111---->R3 direction
1000---->R5 direction
1001---->R7 direction
1010---->R9 direction Because, edge detection error may still exit in the edge signal EG'[3:0], the system 50 employs a post processing block 62 to remove possible error. In general, two types of error may exist. The first type of error occurs when the system detects a "no edge" area as an edge area, and the second type of error occurs when the system detects an area with edge as a "no edge area." For the first type of false detection, there will be serious interpolation error on the interpolated image if the interpolation follows the detected false edge direction. For the second kind of error, a jagged effect may appear on the image where there is an edge.

The post-processing block 62, which is performed on the edge signal, is designed to substantially eliminate or remove these types of errors. FIG. 5 is a block diagram illustrating the edge signal post-processing block, according to one embodiment of the present invention. In one embodiment, post-processing block 62 includes several blocks, portions or steps 72–78, as shown in FIG. 5. Post-processing block 62 utilizes a statistical method to remove errors. Particularly, the post-processing method is based on the following assumptions:

1. For areas where a true edge exists, most of the "pre-processed" edge signal EG'[3:0] is correct (e.g., with true edge direction detected).

2. For areas with no edge, most of the pre-processed edge signals EG'[3:0] are correct (e.g., with no edge direction detected, actually fall back to 90 degrees).

3. The detected edge signal should be continuous along the edge direction. For example, if for pixel X(i,j), the detected edge direction is L3, that means there is an edge that passes through pixel Y03 and Y15. If we extend the line through Y03 and Y15 along its direction, then the edge signal EG'[3:0] for pixel X(i−2, j−2) and X(i+2, j+2) should also be L3.

Based on the above three assumptions, the following post-processing technique will be applied on the detected the edge signal. In one embodiment, the edge signal passes through three horizontal and vertical "five points" median filters, represented by blocks 72, 74 and 76, and then passes through an edge signal continuity check block 78.

FIGS. 6A and 6B illustrate the operation of the horizontal and vertical five points median filters. FIG. 6A illustrates the five locations or pixels used for the horizontal and vertical five points median filter. As shown in FIG. 6A, the equation for the horizontal and vertical five points median filter is:

$$\text{Output}=\text{median5}(EG(i-2,j),EG(i,j-1),EG(i,j),EG(i,j+1),EG(i+1,j));$$

where the function median5( ) is effective to calculate the median value of the five inputs.

FIG. 6B is a block diagram illustrating one implementation of the vertical and horizontal five points median filter. It should be appreciated that each of the five points median filters 72, 74 and 76 may be substantially identical in structure and function. The embodiment shown in FIG. 6B uses two line delay blocks 80 and four pixel delay blocks 82 to select the pixels shown in FIG. 6A. The five points median filter 84 receives the edge detection signals from each of the blocks and calculates the median value according the median5( ) function illustrated above. The resulting signal is communicated to the next filter, and the process is repeated. This filtering process is performed three consecutive times, as shown in FIG. 5.

Figure 7:
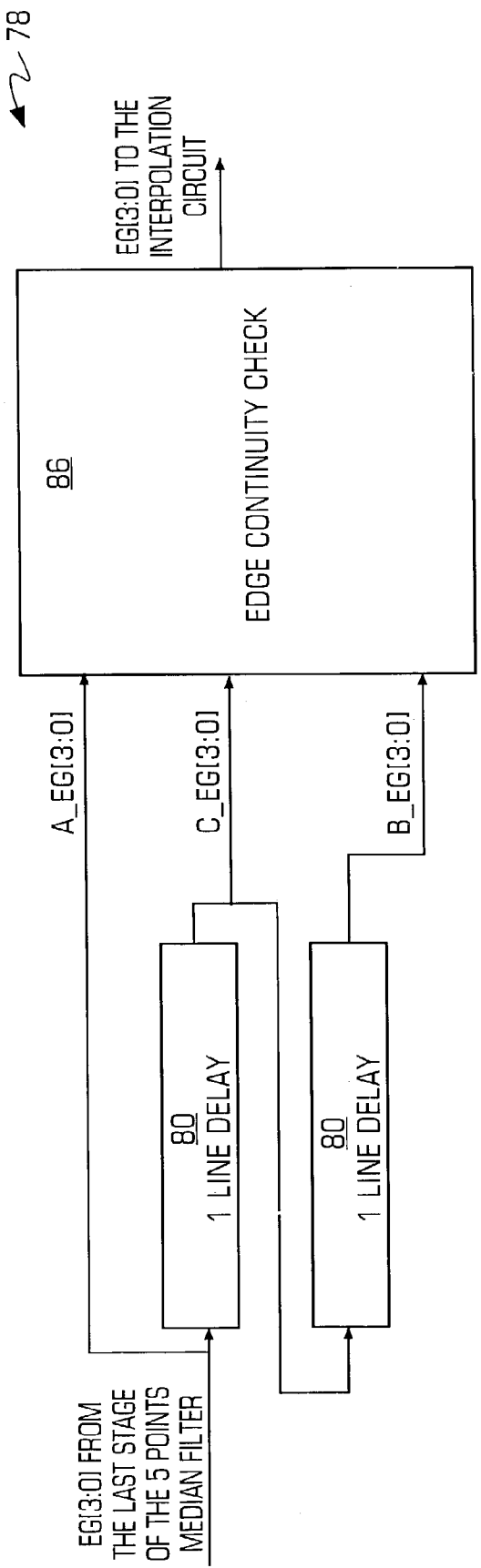
FIG. 7 is a block diagram illustrating a method and system for performing an edge continuity check, according to one embodiment of the present invention.

After the three horizontal and vertical five points median filters, the edge signal is communicated to the edge signal continuity check block to check edge signal continuity. In one embodiment, the system uses three lines of edge signal to check the continuity. FIG. 7 shows one implementation of the edge continuity check block 78. In the implementation shown in FIG. 7, A_EG[3:0] represents the edge signal one line above the current line, C_EG[3:0] depicts the edge signal of the current line, and B_EG[3:0] depicts the edge signal one line below the current line. Signals C_EG[3:0] and B_EG[3:0] are obtained using line delay blocks 80. All of the three edge signals (A_EG[3:0], B_EG[3:0], and C_EG[3:0]) depicted in FIG. 7 have been processed by the three horizontal and vertical five points median filters. The signals A_EG[3:0], B_EG[3:0], and C_EG[3:0] are communicated to edge continuity check block 86, which generates the processed output EG[3:0].

In the one embodiment, block 86 performs the following edge continuity check algorithm to generate the output signal EG[3:0] (i.e., Output_EG(i,j)):

$$\text{If}(C\_EG(i,j) == L9) \text{ AND } (A\_EG(i-2, j-8) == L9) \text{ AND } (B\_EG(i+2, j+8) == L9))$$

$$\text{Then Output\_EG}(i, j) = L9;$$

$$\text{Else Output\_EG}(i, j) = \text{MID};$$

$$\text{If}(C\_EG(i,j) == L7) \text{ AND } (A\_EG(i-2, j-6) == L7) \text{ AND } (B\_EG(i+2, j+6) == L7))$$

$$\text{Then Output\_EG}(i, j) = L7;$$

$$\text{Else Output\_EG}(i, j) = \text{MID};$$

$$\text{If}(C\_EG(i,j) == L5) \text{ AND } (A\_EG(i-2, j-4) == L5) \text{ AND } (B\_EG(i+2, j+4) == L5))$$

$$\text{Then Output\_EG}(i, j) = L5;$$

$$\text{Else Output\_EG}(i, j) = \text{MID};$$

$$\text{If}(C\_EG(i,j) == L3) \text{ AND } (A\_EG(i-2, j-2) == L3) \text{ AND } (B\_EG(i+2, j+2) == L3))$$

$$\text{Then Output\_EG}(i, j) = L3;$$

$$\text{Else Output\_EG}(i, j) = \text{MID};$$

$$\text{If}(C\_EG(i,j) == L2) \text{ AND } (A\_EG(i-2, j-1) == L2) \text{ AND } (B\_EG(i+2, j+2) == L2))$$

$$\text{Then Output\_EG}(i, j) = L2;$$

$$\text{Else Output\_EG}(i, j) = \text{MID};$$

$$\text{If}(C\_EG(i,j) == R2) \text{ AND } (A\_EG(i-2, j+1) == R2) \text{ AND } (B\_EG(i+2, j-1) == R2))$$

$$\text{Then Output\_EG}(i, j) = R2;$$

$$\text{Else Output\_EG}(i, j) = \text{MID};$$

-continued

If(C_EG($i, j$) == $R3$) AND (A_EG($i-2, j+2$) == $R3$) AND (B_EG($i+2, j-2$) == $R3$))

Then Output_EG($i, j$) = $R3$;

Else Output_EG($i, j$) = MID;

If(C_EG($i, j$) == $R5$) AND (A_EG($i-2, j+4$) == $R5$) AND (B_EG($i+2, j-4$) == $R5$))

Then Output_EG($i, j$) = $R5$;

Else Output_EG($i, j$) = MID;

If(C_EG($i, j$) == $R7$) AND (A_EG($i-2, j+6$) == $R7$) AND (B_EG($i+2, j-6$) == $R7$))

Then Output_EG($i, j$) = $R7$;

Else Output_EG($i, j$) = MID; and

If(C_EG($i, j$) == $R9$) AND (A_EG($i-2, j+8$) == $R9$) AND (B_EG($i+2, j-8$) == $R9$))

Then Output_EG($i, j$) = $R9$;

Else Output_EG($i, j$) = MID.

Referring back to FIG. 2, the processed edge signal EG[3:0] is then communicated to the edge direction interpolation block 54, along with luminance values Y00 through Y08 and Y10 through Y18.

Figure 8:
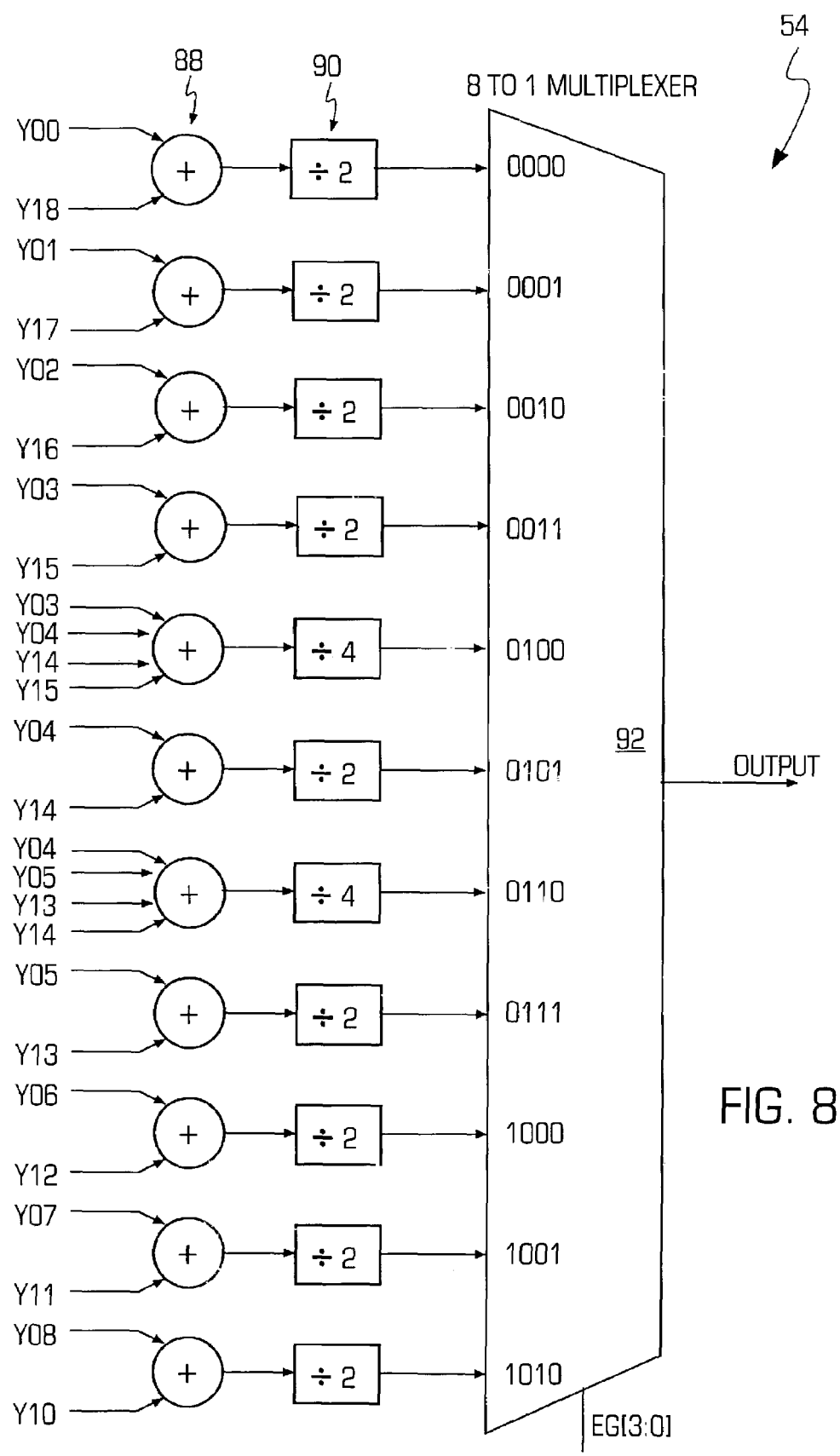
FIG. 8 is a block diagram illustrating a method and system for generating an interpolated pixel, according to one embodiment of the present invention.

Edge direction interpolation block 54 performs adaptive interpolation along the detected edge direction. FIG. 8 is a block diagram illustrating one embodiment of an edge direction interpolation block 54. Edge direction interpolation block 54 includes summing blocks 88, which represent addition functions or logic, division blocks 90, which represent division functions or logic, and multiplexer 92, which represents an 8 to 1 multiplexer. The illustrated luminance values for the various pixels Y00 through Y18 are added at each of the summing blocks 88, and the sums are communicated to the various division blocks 90, where they are divided by two or four, as shown in FIG. 8. The output from the respective division blocks are communicated to the multiplexer 92, which further receives the edge signal EG[3:0]. The multiplexer utilizes the received signals to generate an output signal X in the following manner:

If edge direction is L9, then X=(Y00+Y18)/2;
  If edge direction is L7, then X=(Y01+Y17)/2;
  If edge direction is L5, then X=(Y02+Y16)/2;
  If edge direction is L3, then X=(Y03+Y15)/2;
  If edge direction is L2, then X=(Y03+Y04+Y14+Y15)/4;
  If edge direction is R2, then X=(Y04+Y05+Y13+Y14)/4;
  If edge direction is R3, then X=(Y05+Y13)/2;
  If edge direction is R5, then X=(Y06+Y12)/2;
  If edge direction is R7, then X=(Y07+Y11)/2;
  If edge direction is R9, then X=(Y08+Y10)/2;
  Else X=(Y04+Y14)/2.

Referring back to FIG. 2, the output signal X from interpolation block 54 is communicated to post-processing block 56. Using the above edge adaptive interpolation, any edge direction detection error may possibly generate an inaccurate output. If such result directly goes to the display, there may exist annoying dot noise when the edge direction is not correct. The edge detection algorithm can not always guarantee 100% accuracy, especially for pictures with great detail. To remove such artifacts related with inaccurate edge direction, the present invention includes post-processing block 56, which is performed after the edge adaptive interpolation to remove such noise.

Figure 9:
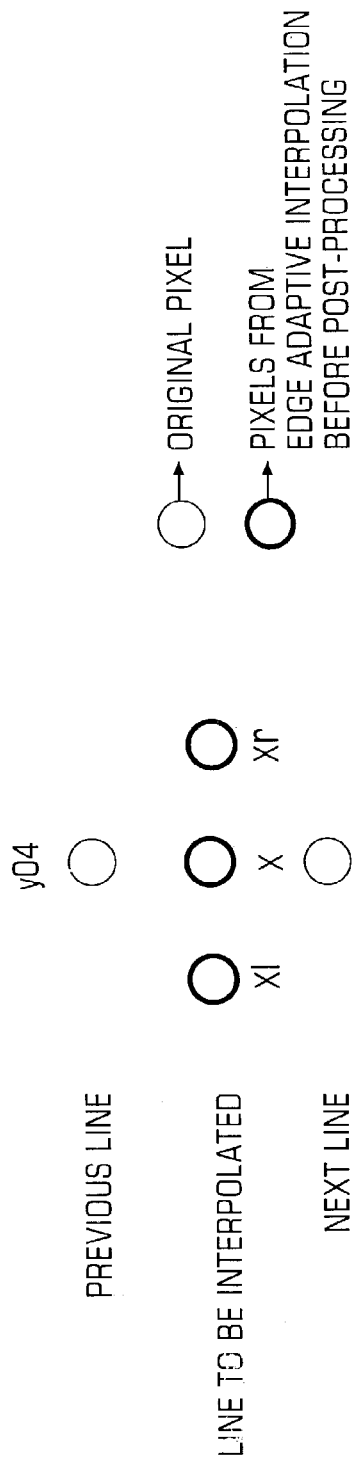
FIG. 9 illustrates a group of pixels used in a post-processing method and system, according to one embodiment of the present invention.
Figure 10:
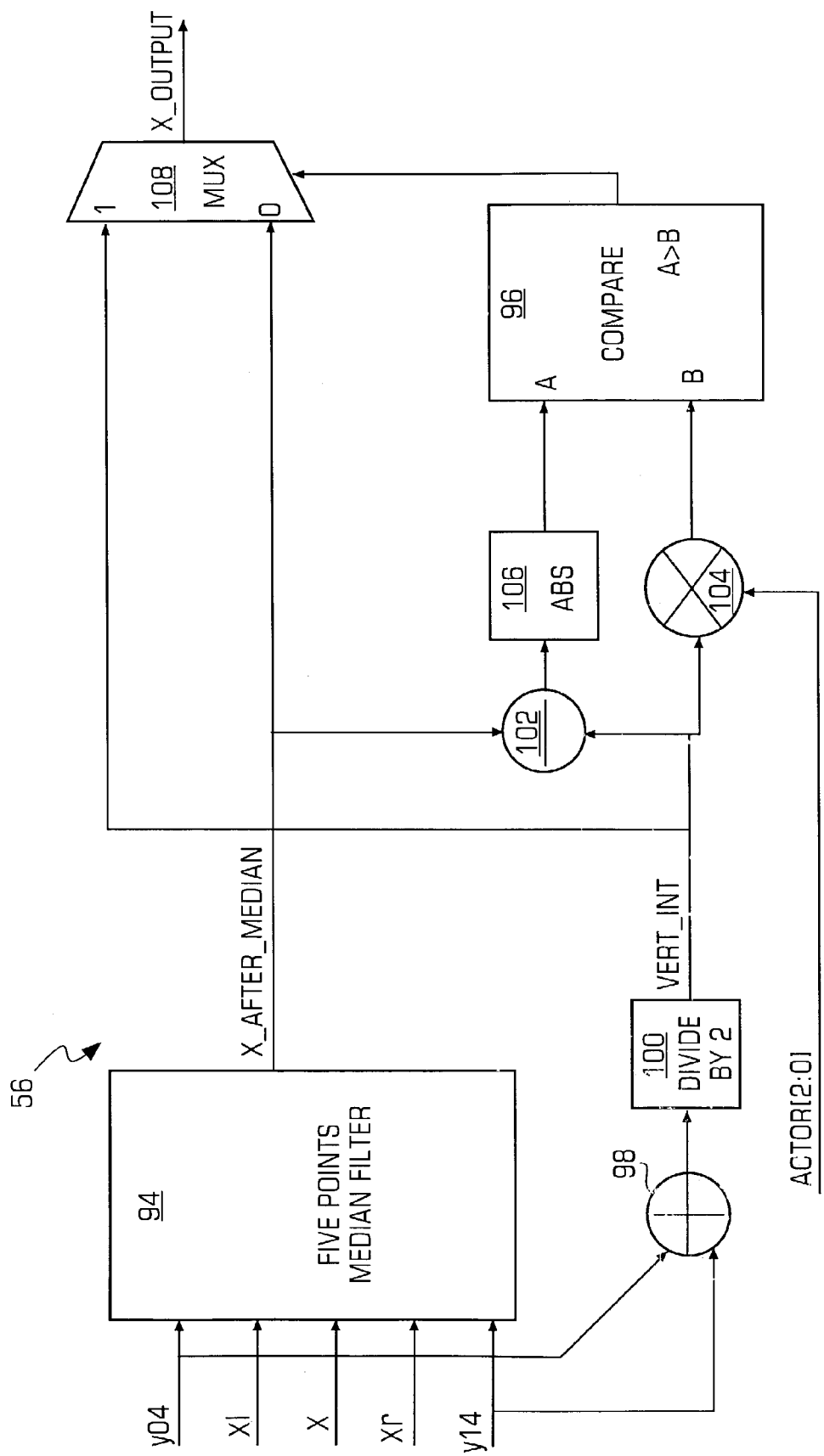
FIG. 10 is a block diagram illustrating a post-processing method and system, according to one embodiment of the present invention.

FIG. 10 illustrates one embodiment of post-processing block 56. As shown, block 56 includes a five points median filter 94, a comparator 96, summing block 98, division block 100, subtraction block 102, multiplication block 104, absolute value block 106 and multiplexer 108. FIG. 9 illustrates five points used for the filter 94, according to one example. In this example, since X is interpolated by the pixels above and below, there should be no vertical high frequency component along Y04, X and Y14, where X is the edge adaptive interpolation result. On this basis, if X is larger than both Y04 and y13 or X is smaller than both Y04 and Y14, the system will consider X to be incorrect or dot noise created by inaccurate edge direction. A median filter is well known to have the ability to remove such impulsive noise. In this embodiment, the system uses a five points median filter 94 to remove the dot noise.

The data or output signal X from the edge adaptive interpolation is first communicated to five points median filter 94, along with signals Y04, Y14, Xl and Xr.

X_after$_{13}$ median=median5(Y04, Y14, X, Xl, Xr);
  Where
    Function median5(a,b,c,d,e) is effective to select the middle value of a, b, c, d, e
    Y04 is the pixel luminance value right above X
    Y14 is the pixel luminance value right below X
    Xl is the result of edge adaptive interpolation for the pixel left to X
    Xr is the result of edge adaptive interpolation for the pixel right to X After the median filter 94, the result (i.e., signal X_after_median) is compared with (Y04+Y14)/2 to see if the difference between them are too great. If the values are too far apart, the system concludes that the interpolation result is not reliable and replaces the output by (y04+y14)/2. The replacement is performed by multiplexer 108. As shown in FIG. 10, the process includes the following calculations, which are performed by blocks 98–108:

$Vert_{13}$ int=(y04+y14)/2;
   If (abs(X_after_median$_{13}$ Vert_int)>(Vert$_{13}$ int*factor))
      Then $X_{13}$ output=(y04+y14)/2;
   Else
      X_output=$X_{13}$ after_median.

Blocks 98 and 100 are effective to provide the Vert_int signal. Blocks 102 and 106 cooperate to provide input A to comparator 96, which is equal to the absolute value of ($X_{13}$ after$_{13}$ median−Vert$_{13}$ int). Block 104 is effective to multiply Vert$_{13}$ int by an appropriate factor [2:0] to provide input B to comparator 96. The value of the factor may be selected in an appropriate manner by an operator of a system based on a desired accuracy, the parameters of the system and/or trial an error. Comparator 96 is effective to compare A and B, and signal multiplexer 108 selects as $X_{13}$ output, X_after_median if the result is reliable (i.e., A is not greater than B), or (y04+y14)/2 if the result is not reliable (i.e., A is greater than B). Output signal $X_{13}$ output may then be provided to the image display device to be displayed as part of the interpolated image.

Figure 11A:
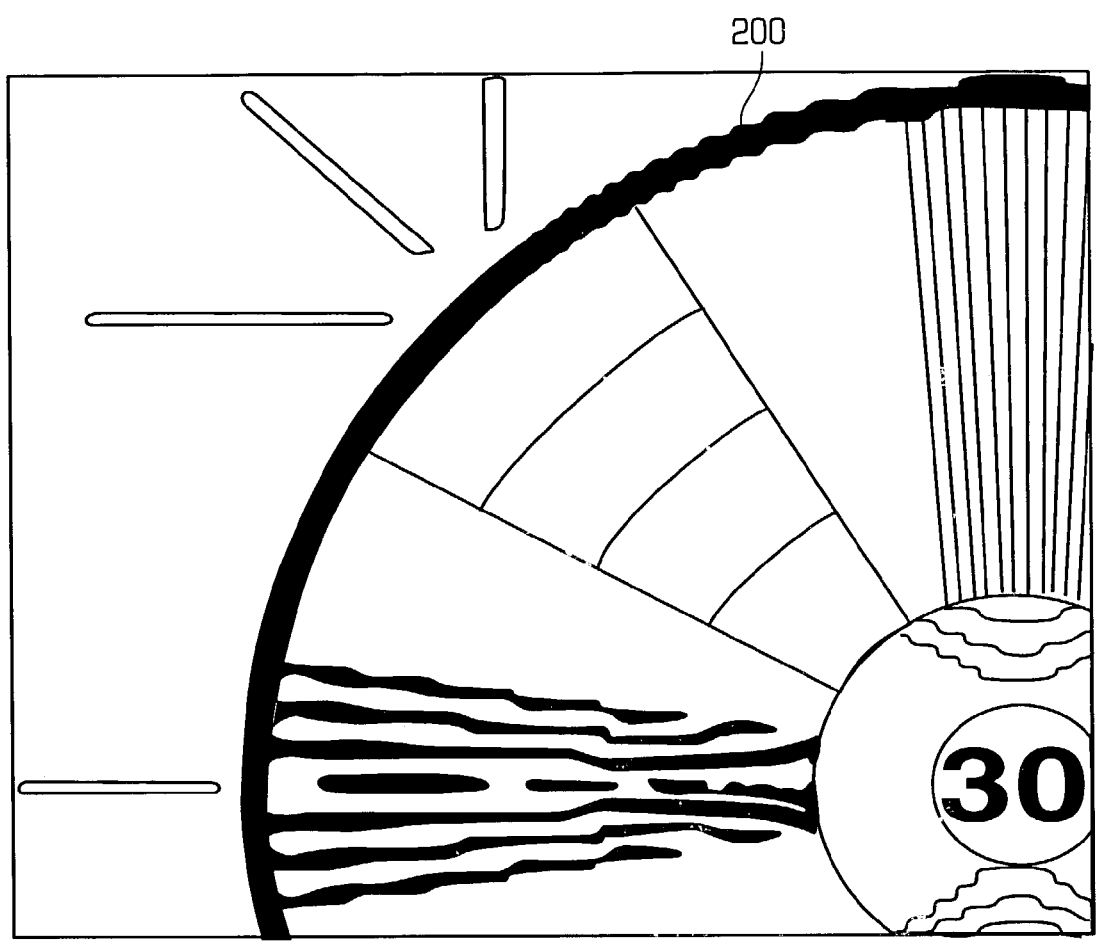
FIG. 11A is a partial screen shot of an image showing the result of interlace-to-progressive conversion using only vertical interpolation.
Figure 11B:
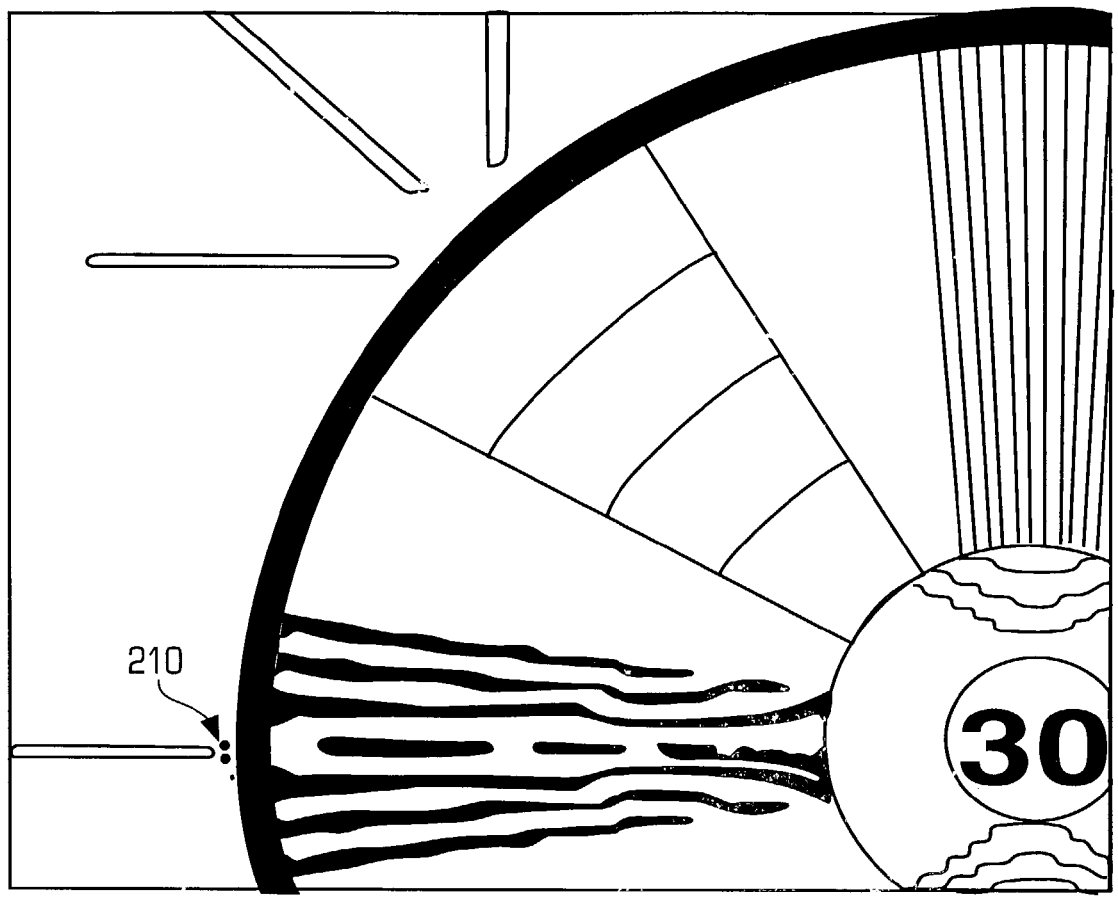
FIG. 11B is a partial screen shot of the image shown in FIG. 11A after interlace-to-progressive conversion using an embodiment of the proposed edge adaptive interpolation method and system, but without post-processing.
Figure 11C:
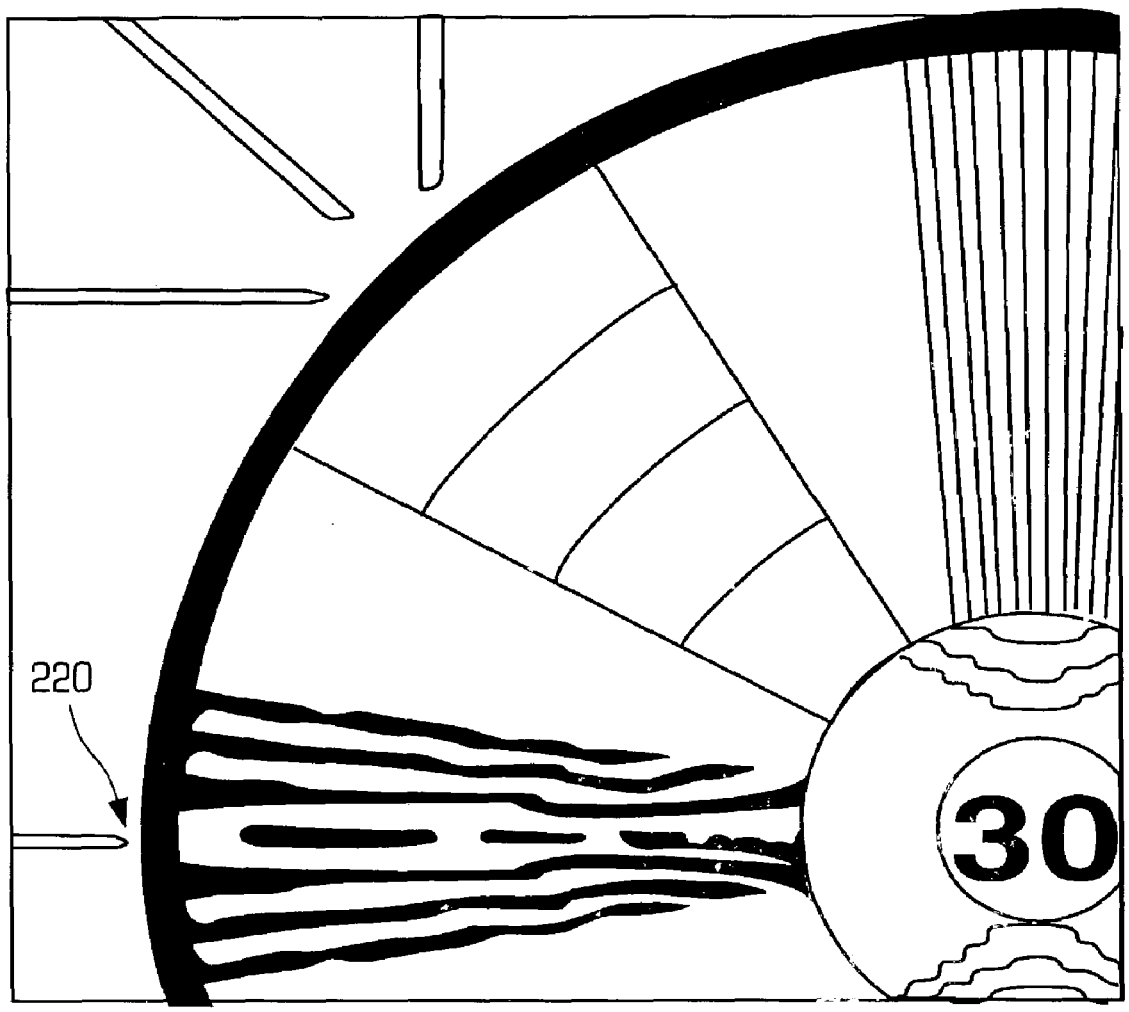
FIG. 11C is a partial screen shot of the image shown in FIGS. 11A and 11B after interlace-to-progressive conversion using an embodiment of the proposed edge adaptive interpolation method and system, including the post-processing as described herein.

FIG. 11A is a partial screen shot of an image showing the result of interlace-to-progressive conversion using only vertical interpolation. Jagged edges 200 are clearly visible in FIG. 11A. FIG. 11B is a partial screen shot of the same image after interlace-to-progressive conversion using an embodiment of the proposed edge adaptive interpolation method and system, but without post-processing. Note that the resolution of the image is significantly improved. However, resulting dot noise is visible, as indicated by arrow 210. FIG. 11C is a partial screen shot of the same image after interlace-to-progressive conversion using an embodiment of the proposed edge adaptive interpolation method and system, including the post-processing as described herein. As can be seen, the dot noise of FIG. 11B has been eliminated, as shown by arrow 220 of FIG. 11C, which points to the same area as arrow 210 of FIG. 11B.

The sensitivity and reliability of the post-processing can be controlled by varying the product of the Vert$_{13}$ int signal and the factor[2:0] (i.e., by altering the value of the factor). Post-processing block 56 can thus provide as an output either the edge adaptive interpolated value for interpolated pixel 12, or a vertical interpolation value, which is the average of the pixels immediately above and immediately below the interpolated pixel 12. The factor[2:0] serves to adjust the sensitivity of the edge interpolation such that the more reliable of the two values is output from post-processing block 56.

Embodiments can be implemented in a computer readable medium as part of a system, such as a computer or television set. Alternatively, the system can be much smaller, such as an integrated circuit. A processor within the system can access the computer readable media and execute the code therein as a set of instructions for the system. The computer readable medium can comprise a hard drive, CD ROM, integrated circuit RAM or ROM, or the like. Thus, the embodiments can be implemented on a CPU in a processor, or in a custom-made chip with etched-in logic. Typically, embodiments can be hard-wired to reduce the computational resources necessary to perform the interpolation. The embodiments can be implemented on an interlace-to-progressive conversion chip, such as that disclosed in the '277 application. The embodiments can thus provide an advantage of reduced defects in an image signal to a display. Unlike the prior art, the present invention computes separate correlation values for each possible edge direction and uses data from neighboring points (e.g., summations over neighboring points) to determine these values. The present invention further uses a "9×2" interpolation window and improved post-processing techniques. The result is an improved edge adaptive interpolation process and interlace-to-progressive conversion.

Although the present invention has been particularly described with reference to the preferred embodiments thereof, it should be readily apparent to those of ordinary skill in the art that changes and modifications in the form and details may be made without departing from the spirit and scope of the invention. It is intended that the appended claims include such changes and modifications. It should be further apparent to those skilled in the art that the various embodiments are not necessarily exclusive, but that features of some embodiments may be combined with features of other embodiments while remaining with the spirit and scope of the invention.

What is claimed is:

1. A method of edge adaptive interpolation for improving the resolution of a pixilated image, the method comprising the steps of:
receiving data for a first group of pixels and a second group of pixels;
determining whether an edge within the image passes through a first pixel located between the first and second group of pixels and whether the edge extends in a first set of directions or a second set of directions to identify a selected set of directions, including calculating correlation values for each of the directions in the first and second sets;
selecting a direction signal from the selected set of directions by selecting a minimum correlation value for the selected set of directions;
performing a post-processing procedure on the selected direction signal to substantially remove possible error; and
determining a luminance value for the first pixel in response to the selected direction.

2. The method of claim 1, wherein each of the first and second group of pixels includes at least 5 pixels.

3. The method of claim 1, wherein each of the first and second group of pixels includes at least 7 pixels.

4. The method of claim of claim 1, wherein each of the first and second group of pixels includes 9 pixels.

5. The method of claim 1, wherein:
the first group of pixels extend in a first direction; and
the second group of pixels extends in a second direction that is substantially parallel to the first direction.

6. The method of claim 1 wherein the post-processing procedure comprises applying at least one five points median filter to the selected direction signal.

7. The method of claim 1 wherein the post-processing procedure comprises applying three consecutive five points median filters to the selected direction signal.

8. The method of claim 7 wherein the post-processing procedure further comprises performing an edge signal continuity check on the selected direction signal.

9. The method of claim 8 wherein the edge signal continuity check includes checking continuity of the edge in lines of pixels above and below the first pixel.

10. The method of claim 1 wherein each of the correlation values includes a summation of luminance value differences over a sequence of neighboring points.

11. The method of claim 10 wherein the summation is taken over fifteen points.

12. The method of claim 1 wherein the first set of directions lie between 0 and 90 degrees, and the second set of directions lies between 90 and 180 degrees.

13. The method of claim 12 further comprising determining whether the edge lies at approximately 90 degrees.

14. A system for improving the resolution of a pixilated image comprising:
   a first portion for receiving data for a first group of pixels and a second group of pixels;
   a second portion for determining whether an edge within the image passes through a first pixel located between the first and second group of pixels and whether the edge extends in a first set of directions or a second set of directions to identify a selected set of directions, the second portion being adapted to make the determination by calculating correlation values for each of the directions in the first and second sets;
   a third portion for selecting a direction signal from the selected set of directions by selecting a minimum correlation value for the selected set of directions;
   a fourth portion for performing a post-processing procedure on the selected direction signal to substantially remove possible error; and
   a fifth portion for determining a luminance value for the first pixel in response to the selected direction.

15. The system of claim 14, wherein each of the first and second group of pixels includes at least 5 pixels.

16. The system of claim 14, wherein each of the first and second group of pixels includes at least 7 pixels.

17. The system of claim of claim 14, wherein each of the first and second group of pixels includes 9 pixels.

18. The system of claim 14, wherein:
   the first group of pixels extend in a first direction; and
   the second group of pixels extends in a second direction that is substantially parallel to the first direction.

19. The system of claim 14 wherein the fourth portion comprises at least one five points median filter which is applied to the selected direction signal.

20. The system of claim 14 wherein the fourth portion comprises three consecutive five points median filters which are applied to the selected direction signal.

21. The system of claim 20 wherein the fourth portion is further adapted to perform an edge signal continuity check on the selected direction signal.

22. The system of claim 21 wherein the edge signal continuity check includes checking continuity of the edge in lines of pixels above and below the first pixel.

23. The system of claim 14 wherein each of the correlation values includes a summation of luminance value differences over a sequence of neighboring points.

24. The system of claim 23 wherein the summation is taken over fifteen points.

25. The system claim 14 wherein the first set of directions lie between 0 and 90 degrees, and the second set of directions lies between 90 and 180 degrees.

26. The system of claim 25 wherein the second portion is further adapted to determine whether the edge lies at approximately 90 degrees.

* * * * *